United States Patent [19]
Williams

[11] Patent Number: 4,751,622
[45] Date of Patent: Jun. 14, 1988

[54] SOLAR POWERED CONSTRUCTION LIGHT

[75] Inventor: Lloyd E. Williams, West Monroe, La.

[73] Assignee: Power Plus, Inc., Monroe, La.

[21] Appl. No.: 34,709

[22] Filed: Apr. 6, 1987

[51] Int. Cl.⁴ .............................................. F21L 7/00
[52] U.S. Cl. .................................... 362/183; 362/186
[58] Field of Search ............... 362/190, 191, 200, 186, 362/157, 183

[56] References Cited

U.S. PATENT DOCUMENTS

| | | | |
|---|---|---|---|
| 3,180,979 | 4/1961 | Thurston | 362/186 |
| 3,221,300 | 9/1961 | Elledge, Jr. | 362/190 |
| 3,264,461 | 6/1964 | Osburn | 362/190 |
| 3,351,751 | 11/1967 | Stube et al. | 362/186 |
| 3,500,378 | 3/1970 | Pickering et al. | 362/186 |
| 4,122,396 | 10/1978 | Grazier | 325/492 |
| 4,387,416 | 6/1983 | Decker | 362/190 |
| 4,481,562 | 11/1984 | Hickson | 362/183 |
| 4,482,941 | 11/1984 | Lindner | 362/186 |
| 4,516,109 | 5/1985 | Thurston | 362/190 |
| 4,563,727 | 1/1986 | Curiel | 362/183 |

Primary Examiner—E. Rollins Cross
Attorney, Agent, or Firm—David L. Ray

[57] ABSTRACT

A solar powered construction light including a solar powered battery recharging network that recharges a storage battery at a constant rate and can be selectively operated to burn continuously to produce a continuous light or to burn intermittently to provide a flashing light. A solar cell recharges the storage battery in the light when sunlight is impinging upon the solar cell to provide virtually maintenance free and long term operation of the construction light during the dark or twilight hours when construction lights are commonly employed to warn motorists of road hazards.

17 Claims, 4 Drawing Sheets

SOLAR POWERED CONSTRUCTION LIGHT

BACKGROUND OF THE INVENTION

1. Field of the Invention

The present invention is related to construction lights, and in particular to construction lights utilized on barriers and other construction barricades used in areas of road construction for warning the public of road hazards. Even more particularly, the invention is related to a battery powered construction light having solar cells for charging the storage batteries during the day.

2. Brief Description of the Prior Art

The illumination of hazardous areas where injuries might occur at night or during twilight hours has been accomplished in the past with torches, oil filled containers with a flaming wick, reflective signs or surfaces, and battery powered light units. Most of such warning apparatus work for a limited period of time and require constant and continuous service such as battery replacement, and refueling or relighting. Such service is costly and time consuming.

Another problem encountered with construction lights is theft of the light. Occasionally vandals will remove the lights from the barriers by merely lifting the lights off the barriers and transporting the light to another area. When such vandalism occurs great danger results to the public using the roadway in the vicinity of the area in which the lights are employed. The lights of the prior art for the most part are easily removed from the barrier or other object on which they are placed.

Exemplary of the prior art are the following patents listed in numerical order:

U.S. Pat. No. 4,482,941 discloses an improved barrier light assembly wherein a lens assembly composed of a pair of mating halves is secured to the upper portion of a base assembly by a threaded flanged collet. A peripheral outwardly extending integral neck of the lens assembly extends into the upper portion, and the collet threadably engages the neck. A pair of screw flights are employed which permits use of identical mating halves.

U.S. Pat. No. 4,481,562 discloses a solar power station for providing illumination including a storage battery-powered signaling element, a solar generator for recharging the storage battery and a bracket assembly for supporting the remainder of the components, the bracket assembly being light weight and supporting the solar generator in an orientation to provide adequate exposure to ambient light in a wide variety of sun positions. The apparatus is self-contained, independent in operation and can be left unattended for substantial periods of time.

U.S. Pat. No. 4,563,727 discloses a self-charging solar battery comprising a rechargeable nickel-cadmium cell and a solar electrical panel. Sunlight passing through the transparent housing excites the solar panel which then supplies recharging current to the nickel-cadmium cell.

U.S. Pat. No. 4,387,416 discloses a warning light housing including a light assembly used with street construction barricades, the base having a supporting platform with recesses in its upper surface, the recesses having access holes in the bottom leading into recesses from the exterior, the batteries blocking disassembly by limiting lateral movement of the casing relative to the base, and including a special tool insertable in the access holes of the light assembly to push the batteries out of the recesses to allow disassembly.

U.S. Pat. No. 4,122,396 discloses a stable solar power source for portable electrical devices including solar cells for converting sunlight into electrical energy and a large capacitor for providing a current reserve to satisfy peak current demands and offset the effects of sunlight variation, the solar cells being mounted beneath a light transmitting thermal shield to minimize thermally induced cell output variations.

U.S. Pat. No. 3,221,300 discloses a warning signal device for mounting on a construction barricade which may be easily disassembled for service, operates only while standing upright, shuts itself off when lying on its side, is impervious to moisture, dust, insects and other environmental factors, and a barricade to which the flasher construction may be mounted and attached thereto in a theft-proof manner.

U.S. Pat. No. 3,264,461 discloses a flasher warning light adapted to be mounted on highway construction barricades having an increased life and designed to substantially reduce mechanical fatigue of various parts of the assembly and breakage thereof resulting from shock loads including a battery case, means formed thereon for mounting the case on a road barrier, and a lamp head rotatably mounted on the casing containing a lamp which is energized by a battery mounted within the casing.

U.S. Pat. No. 3,180,979 discloses a warning light having increased brilliance which may be readily converted from a unidirectional light to bidirectional light having a removable reflector which can be stored in the case of the light when not in use.

SUMMARY OF THE INVENTION

In accordance with the present invention there is provided a solar powered construction light including a solar powered battery recharging network that recharges a storage battery at a constant rate and can be selectively operated to burn continuously to produce a continuous light or to burn intermittently to provide a flashing light. A solar cell recharges the storage battery in the light when sunlight is impinging upon the solar cell to provide virtually maintenance free and long term operation of the construction light during the dark or twilight hours when construction light are commonly employed to warn motorists of road hazards.

The light of the present invention also includes an anti-theft pin assembly design to discourage the theft or vandalism of the construction light of the present invention. The pin assembly includes a hollow pin preferably made from a high impact, chemically resistant plastic to resist the effects of extreme weather and corrosive environments. The hollow pin has a series of holes on the periphery thereof into which is inserted a spring having at least two tines that protrude through holes in the shaft of the pin. The pin can be inserted through a barricade on which the light is to be attached and then into the body of the light itself. When the spring is placed inside the pin, the tines are aligned with the holes in the pin and inserted therethrough to permit the removal of the pin only with a tool which is inserted into the hollow body of the pin to depress the spring tines.

The solar powered construction light of the present convention can operate for extended periods of time with no maintenance. The solar cells continuously recharge the storage battery in the light when the rays of the sun impact upon the solar cell. Furthermore, the construction light of the present invention can not be removed from a barricade without special tools provided in accordance with the present invention.

The construction light of the present invention is preferably made of materials which are corrosion resistant enabling the light to be used for extended periods of time in chemical plants having corrosive atmospheres and around salt water without corrosive damage. The construction light of the present invention light is preferably manufactured from ultra violet stabilized highly impact resistance plastic so that the light of the present invention will resist environmental stress cracking and the effects of weather. The construction light of the present invention does not contain any busbars contacting any battery contacts thereby eliminating corrosion of contacts. The battery is sealed and no discharge of acid occurs, therefore preventing corrosion of the light throughout its life.

BRIEF DESCRIPTION OF THE DRAWINGS

The invention will be more clearly understood by reference to the drawings in which.

DESCRIPTION OF THE PREFERRED EMBODIMENTS

Figure 1:
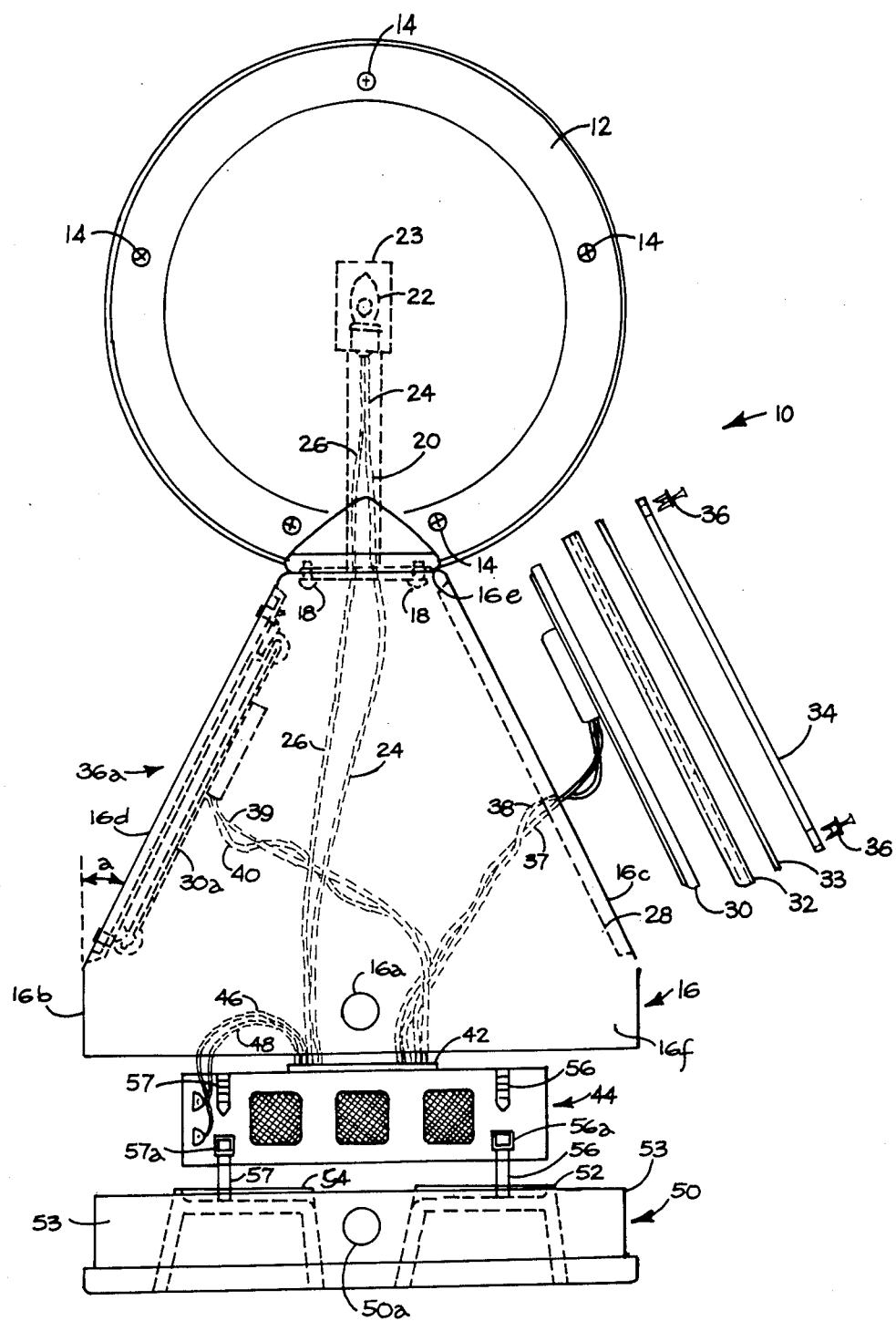
FIG. 1 is a partly exploded plan view of the construction light of the present invention.
Figure 2:
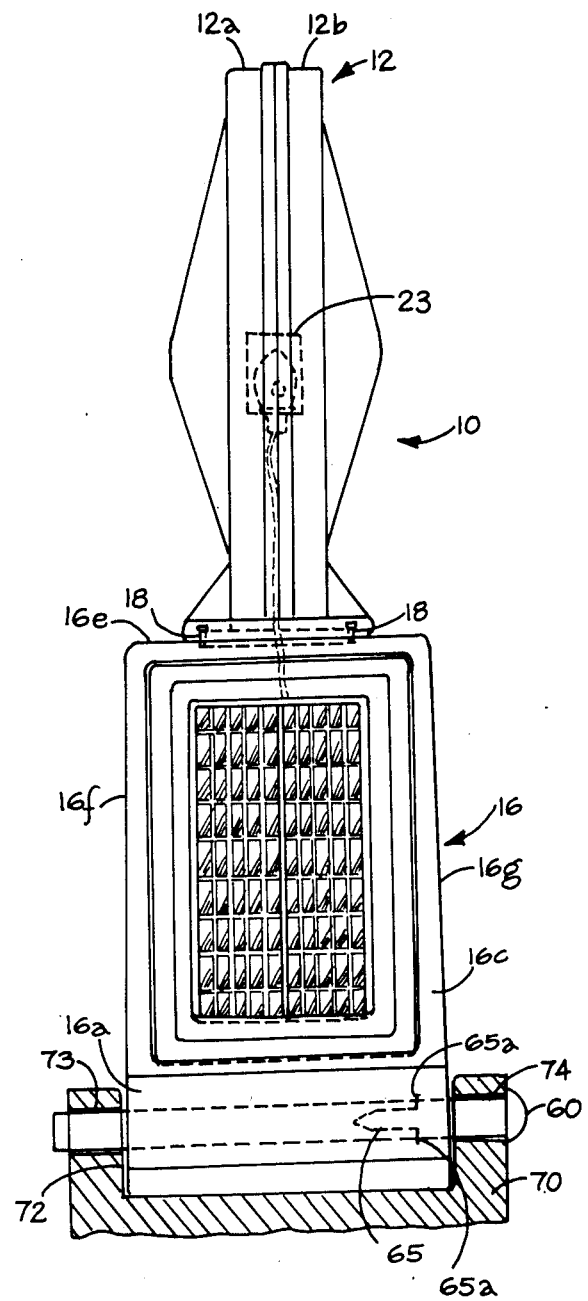
FIG. 2 is a side plan view of the construction light of the present invention attached to a partly cut-away, cross sectional view of a barricade.

Referring now to FIGS. 1 and 2, the construction light of the present invention is generally indicated by the numeral 10. At the top of lamp 10 is a translucent or transparent, preferably amber lens generally indicated by the numeral 12. As can best be seen in FIG. 2, lens 12 is preferably made from two identical lens halves 12a and 12b which are connected together by screws 14 as shown in FIG. 1.

The entire lens assembly 12 is connected to the lamp casing generally indicated by the numeral 16 by screws 18. Also connected by screws 18 is pedestal 20 upon which is connected light bulb 22.

Light bulb 22 has wires 24 and 26 extending downwardly therefrom. Wires 24 and 26 are preferably electrically conductive, insulated wires such as copper wires, for example.

Figure 3:
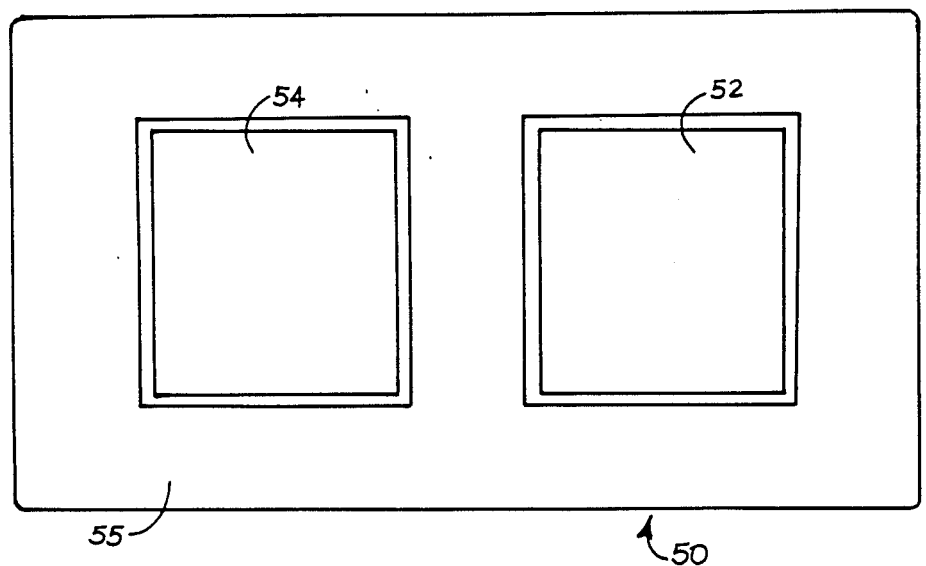
FIG. 3 is a bottom plan view of the construction light of the present invention.

As can be seen in FIGS. 1 and 3, casing 16 has two recessed portions 28-28 molded in opposite sides thereof for receipt of solar cells 30 and 30a. Solar cell 30 preferably is fitted into gasket 32 which is, in turn, fitted with another rectangular gasket 33 and covered by a clear, preferably, acrylic, lens 34.

Casing 16 has two opposed vertical base walls 16a and 16b integrally molded with two opposed solar cell receiving walls 16c and 16d which converge toward the top surface 16e of casing 16. The solar cell receiving walls 16c and 16d form an angle A with the vertical shown in FIG. 1 of from about 30° to about 45° to align the solar cells to receive more effectively energy from the sum.

Walls 16f and 16g are vertical opposed walls. Preferably casing 16 is molded as a one piece unit from a conventional weather resistant plactic material.

The entire solar cell and lens assembly shown in FIG. 1 is held in place by fasteners 36 which are received in holes (not shown) in casing 16. Fasteners 36 are preferably plastic snap rivets, although screws are other fasteners may be used if desired. An identical assembly of solar cell 30a, gaskets, and lens is contained on the opposite side of casing 16 as indicated by the numeral 36a.

Figure 7:
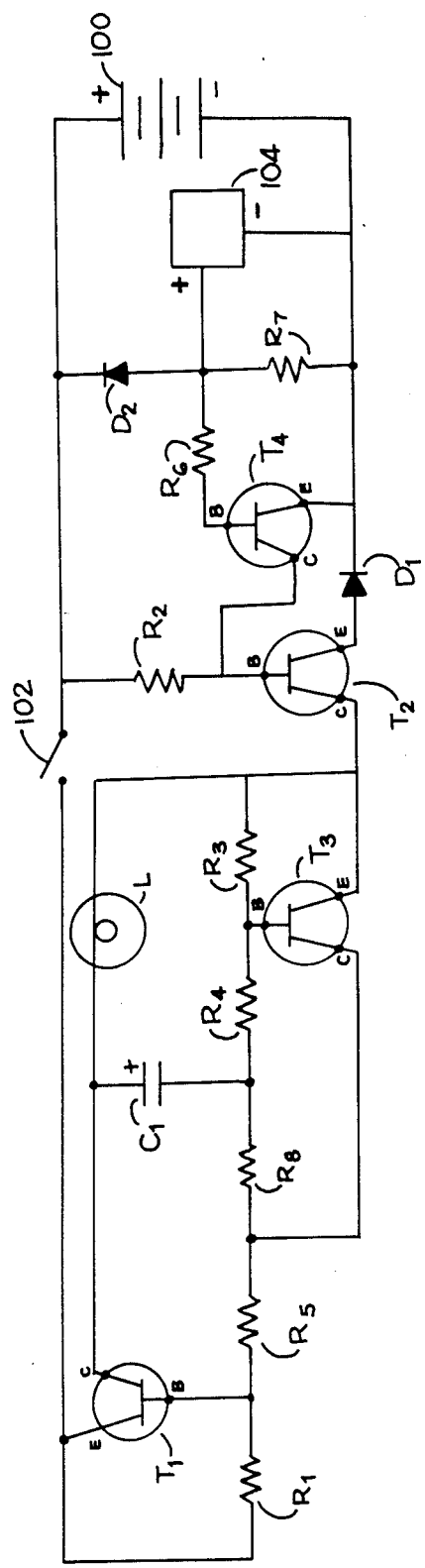
FIG. 7 is a schematic view of the circuit diagram of the electrical circuitry of the present invention.

Extending from solar cells 30 and 30a are electrically conductive wires 37, 38, 39 and 40, all of which are connected to the printed circuit board 42 which contains the circuitry indicated in FIG. 7. Circuit board 42 is electrically connected to the storage battery generally indicated by the numeral 44 by wires 46 and 48 as indicated in FIG. 1 and board 42 is physically attached to storage battery 44 by gluing, screwing or the like.

Located beneath casing 16 is the base generally indicated by the numeral 50. Base 50 is generally rectangular in shapre, having a rectangular bottom 55, and rectangular sidewalls 53 extending perpendicularly upwardly therefrom. Base 50 has two pedestals 52 and 54 molded therein on which storage battery 44 rests. Pedestals 52 and 54 extend upwardly from bottom 55. Sidewalls 53 are adapted to be received within casing 16. Straps 56 and 57 are connected by any conventional means to the tops of pedestals 52 and 54 and extend around and over storage battery 44 to securely hold storage battery 44 to the top of pedestals 56 and 57. Straps 56 and 57 are preferably conventional straps of the nylon type which lock in place when inserted into the buckles 56a and 57a. Any conventional strap may be used if desired in place of straps 56 and 57.

Figure 4:
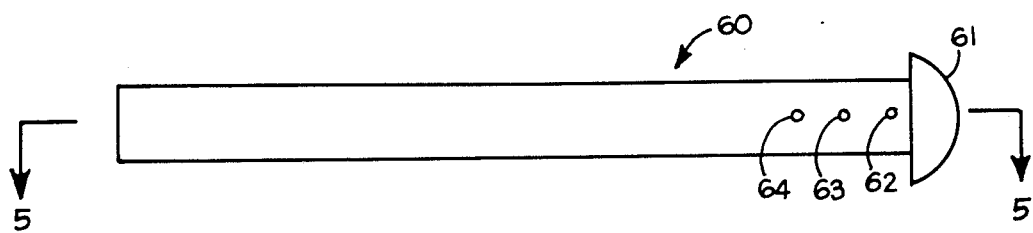
FIG. 4 is a plan view of a locking pin of the present invention.
Figure 5:
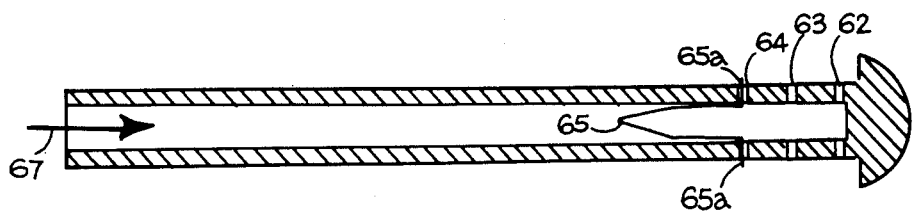
FIG. 5 is a cross-sectional view taken along lines 5—5 of FIG. 4.

A hole 16a in casing 16, and hole 50a in casing 50 are located on each wall of casing 16 and base 50 respectively, for receipt of pin 60 to serve the light to a barricade. A preferred embodiment of pin 60 is best seen in FIGS. 4 and 5. Pin 60 has a head 61 thereon, is hollow inside and has a series of holes 62, 63 and 64 therein. Holes 62 through 64 cooperate with lock spring 65 as indicated in FIG. 5 and as shown in FIG. 2 to prevent the removal of pin 60 by vandals or thieves. The tines 65a-65a strike the inner wall of barricade 70 as indicated in FIG. 2 when removal of pin 60 is attempted.

Figure 6:
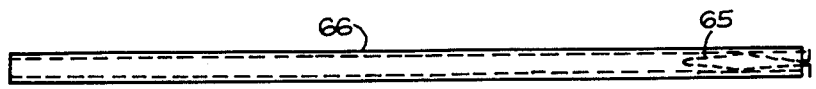
FIG. 6 is a plan view of a tool for removing the spring lock in the locking pin of FIG. 5.

When it is desired to remove spring 65, the tool shown in FIG. 6 may be utilized. The tool shown in FIG. 6 is a hollow cylinder generally designated by the numeral 66 which may be inserted into the hollow interior of pin 61 in the direction indicated by the arrow 67 to contact spring 65 and press spring 65 so that spring 65 may be withdrawn from the interior of bolt 61. Thus a vandal or thief would have to have a tool similar to that shown in FIG. 6 in order to remove light 10 from a barricade.

A barricade is indicated generally by the numeral 70 in FIG. 2 and is shown having a slot 72 in which the light is inserted and having holes 73 and 74 therein through which pin 60 is inserted. Other types of barricades may be utilized in the present invention. Any barricade having a hole therein which pin 60 can be inserted may be utilized. For example, a saw horse type barricade can be utilized by merely inserting pin 60 through the barricade and into construction light 10 spring 65 is then inserted until one of the holes 62 through 64 is contacted and the spring is release. When spring 65 is first inserted in pin 61, tool 66 is not utilized; instead, a solid pin similar in size to tool 66 and at least small enough to be easily received in the hollow portion of pin 67 is utilized to force spring 65 up to one of the holes 62 through 64 at which point the spring will expand into hole.

The circuitry utilized in the construction of the invention will be more clearly understood by referring to FIG. 7, which is a schematic of printed circuit board 42. When a voltage is applied by battery 100 at the indicated polarity by closing switch 102, current flows from battery 100 through resistors $R_1$, $R_5$, $R_8$, $R_4$, $R_3$ to bias transistor $T_1$ through point B on $T_1$, thereby causing electrical current to flow from point E to C of transistor $T_1$ and on through lamp L to point C of transistor $T_2$. $R_8$ is of sufficiently high resistance so that initial current will not bias $T_3$. At the same instant $T_2$ is biased through resistor $R_2$ so that transistor $T_2$ will conduct current from point C to point E of $T_2$, through diode $D_1$ to the negative pole of battery 100, thereby causing lamp L to emit light. $R_2$ is preferably 3.3 ohms, $R_1$ is preferably 1 ohm, $R_3$ is preferably 68 ohms, $R_4$ is preferably 5.1 ohms, $R_5$ is preferably one ohm, and $R_8$ is 120 ohms.

When $T_1$ begins conducting to light lamp L, capacitor $C_1$ begins to charge, and current flows through resistor $R_3$ and $R_4$. When $C_1$ reaches a fully charged state, a voltage potential is reached at point B of transistor $T_3$ sufficient to bias $T_3$ to conduct through point C to E of $T_3$ thereby drawing current through $R_5$ and dropping the voltage at point B of $T_1$ to the point that $T_1$ ceases to conduct from point E to point C of $T_1$, at which point lamp L no longer emits light.

This on/off cycle repeats itself and is dependent on the value of $C_1$, $R_3$, and $R_4$. Preferably, $C_1$ is 10 picofarads.

When voltage is applied by solar cell 104 at the polarity indicated in the drawing, current flows through diode $D_2$ to the positive pole of battery 100 to charge battery 100, and through variable resistor $R_6$ to bias transistor $T_4$ so that current is conducted from point C to point E of $T_4$ thereby shutting $T_2$ off so that as long as this condition is occurring, the lamp circuit will be turned off and the battery will be recharged from the solar cell 104. $R_6$ controls the biasing of $T_4$ thereby allowing the turning on or off of the lamp circuit to be controlled. $R_7$ acts as an input load stabilizer for solar cell output. $R_6$ is preferably 10 ohms, and $R_7$ is preferably 100 ohms.

Preferably, a clear, transparent hollow casing 23 surrounds lamp 22. Casing 23 is preferably made from an acrylic plastic material. Casing 23 aids in dispersing light emitted from lamp 23.

Although the preferred embodiments of the present invention have been disclosed and described in detail above, it should be understood that the invention is in no sense limited thereby, and its scope is to be determined by that of the following claims.

What is claimed is:

1. A self charging light assembly comprising in combination:
   a. a lens assembly comprising:
      (1) a pair of substantially identical translucent or transparent lens halves which are matingly and abuttingly engaged with one another along opposed peripheral edge portions to define an interior chamber therebetween,
      (2) connecting means received by said pair of lens for connecting said lens together,
      (3) light emitting means located in said interior chamber of said lens assembly,
   b. a casing assembly comprising:
      (1) a pair of opposed vertical walls,
      (2) two opposed vertical base walls connecting said pair of opposed vertical walls, said two opposed vertical base walls being connected perpendicularly to said pair of opposed vertical walls,
      (3) two converging solar cell receiving walls connected perpendicularly to said pair of opposed vertical side walls and being connected to said two opposed vertical base walls,
   c. first solar cell means connected to one of said two converging solar cell receiving walls,
   d. second solar cell means connected to the other of said two converging solar cell receiving walls,
   e. rechargeable storage battery means located in said casing means,
   f. base means connectable to said casing means for receiving and holding said storage battery means,
   g. means for electrically connecting said storage battery means to said light emitting means,
   h. means for electrically connecting said first solar cell means to said storage battery means, and
   i. means for electrically connecting said second solar cell means to said storage battery means.

2. The light assembly of claim 1 wherein said base means has pedestal means for receiving and supporting said storage battery means.

3. The light assembly of claim 1 wherein said first and second solar cell means has lens means thereon.

4. The light assembly of claim 1 wherein said base means is generally rectangular in shape.

5. The light assembly of claim 4 wherein said base means has a generally rectangular bottom.

6. The light assembly of claim 5 wherein pedestal means extend upwardly from said bottom of said base means.

7. The light assembly of claim 6 wherein said pedestal means is adapted to receive and support said storage battery means.

8. The light assembly of claim 7 wherein said pedestal means has strap means connected thereto for grasping and holding said storage battery means.

9. The light assembly of claim 5 wherein sidewalls extend upwardly from said bottom.

10. The light assembly of claim 9 wherein said sidewalls have hole means therein for receipt of pin assembly means for securing said light assembly to a barricade means.

11. The light assembly of claim 10 wherein said pin assembly means comprises:
    a. a hollow, cylindrical pin, and
    b. locking means for insertion in said pin means.

12. The light assembly of claim 11 wherein said pin means has hole means therein for receipt of a portion of said locking means.

13. The light assembly of claim 12 wherein said locking means comprises spring means receivable in said hollow pin means.

14. The light assembly of claim 13 wherein said spring means has movable tine means therein which can be inserted into said hole means in said pin means to engage the interior of said vertical walls of said casing means to prevent removal of said pin means.

15. The light assembly of claim 14 wherein said pin means has head means thereon which engages said barricade means.

16. The light assembly of claim 15 wherein said a hollow cylindrical spring removal means is receivable inside said hollow pin means for removal of said spring means.

17. The light assembly of claim 16 wherein said spring removal means has a hollow interior adapted to engage, receive, and compress said spring means sufficiently for said time means to be retracted from pin means.

* * * * *